United States Patent
Oh et al.

(10) Patent No.: US 8,018,425 B2
(45) Date of Patent: Sep. 13, 2011

(54) DRIVING APPARATUS OF LIGHT EMITTING DIODE AND LIQUID CRYSTAL DISPLAY USING THE SAME

(75) Inventors: Eui Yeol Oh, Yongin-si (KR); Haang Rhym Chu, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 1030 days.

(21) Appl. No.: 11/640,089

(22) Filed: Dec. 15, 2006

(65) Prior Publication Data

US 2007/0229446 A1     Oct. 4, 2007

(30) Foreign Application Priority Data

Apr. 4, 2006   (KR) ........................ 10-2006-0030474

(51) Int. Cl.
    *G09G 3/36*      (2006.01)

(52) U.S. Cl. ............... 345/102; 345/76; 345/77; 345/78; 345/204; 345/82; 345/83; 315/169.3; 313/463; 313/505

(58) Field of Classification Search .................. 345/102, 345/76–83, 204; 340/458, 459, 815.45, 457.2, 340/457.3, 457.4, 463, 464, 468, 469, 475; 307/10.1, 10.4; 315/169.3; 313/63, 499, 313/504, 505, 514

See application file for complete search history.

(56) References Cited

U.S. PATENT DOCUMENTS

| | | | |
|---|---|---|---|
| 2002/0145041 A1* | 10/2002 | Muthu et al. | ................. 235/454 |
| 2002/0149938 A1 | 10/2002 | Allen | |
| 2002/0175632 A1* | 11/2002 | Takeguchi | ................. 315/169.1 |
| 2003/0085749 A1* | 5/2003 | Xu et al. | ................. 327/423 |
| 2003/0117087 A1* | 6/2003 | Barth et al. | ................. 315/291 |
| 2003/0132721 A1 | 7/2003 | Jacobs et al. | |
| 2004/0155844 A1 | 8/2004 | Stopa | |
| 2005/0225259 A1* | 10/2005 | Green | ................. 315/224 |
| 2006/0055244 A1* | 3/2006 | Ito et al. | ................. 307/10.8 |
| 2007/0115248 A1* | 5/2007 | Roberts et al. | ................. 345/102 |

FOREIGN PATENT DOCUMENTS

| | | |
|---|---|---|
| DE | 100 13 215 A1 | 9/2001 |
| DE | 102 23 027 A1 | 5/2003 |
| DE | 10 2005 015 989 A1 | 11/2005 |
| DE | 10 2005 041 792 A1 | 3/2006 |
| JP | 2005-310998 | 11/2005 |
| WO | 2005/089309 A2 | 9/2005 |

OTHER PUBLICATIONS

Combined Search and Examination Report issued in corresponding British Patent Application No. GB0622611.2 on Mar. 6, 2007.
LED—Triebwerk In: Technology Traner, Neuheitenmagain für Kunden von Scantec GmbH in D-82110 Germering und Topas electronic GmbH in D-30163 Hannover, Heft 3,Okt 2004.
Office Action issued in corresponding German Patent Application No. 10 2006 052 726; issued Jul. 7, 2009.
Office Action issued in corresponding Japanese Patent Application No. 2006-329266; mailed Apr. 26, 2010.

* cited by examiner

*Primary Examiner* — Lun-Yi Lao
*Assistant Examiner* — Olga Merkoulova
(74) *Attorney, Agent, or Firm* — Brinks Hofer Gilson & Lione (57) ABSTRACT

A driving apparatus of a light emitting diode and a liquid crystal display are disclosed. The driving apparatus of a LED includes a plurality of LED groups in which LEDs are connected in series to each other; a plurality of constant voltage supply units that supplies a constant voltage required to drive a constant current to each of the plurality of LED groups and that outputs the constant voltage in which an output voltage is equal to or lower than an input voltage; and a pulse width modulation signal supply unit that supplies a pulse width modulation signal to each of the constant voltage supply units.

6 Claims, 5 Drawing Sheets

DRIVING APPARATUS OF LIGHT EMITTING DIODE AND LIQUID CRYSTAL DISPLAY USING THE SAME

This Application claims the benefit of priority under 35 U.S.C. §119(a) of Korean Patent Application No. 10-2006-0030474, filed Apr. 4, 2006, the entire contents of which are hereby incorporated by reference.

BACKGROUND

1. Technical Field

This invention relates to a driving apparatus of a light emitting diode, and more particularly to a light emitting diode used as a back light of a flat panel display and a liquid crystal display using the same.

2. Description of the Related Art

Currently, a display device plays a very important role and several display devices has been extensively used in various industry fields.

Generally, a display device is a device for transferring various visual information. That is, a display device is an electronic device for converting an electronic information signal that is output from several electronic appliances to an optical information signal and performs a function for visually connecting between a human being and an electronic device.

In the display devices, a display device in which an optical information signal is displayed by a light emitting process is called a light emitting display device and a display device in which an optical information signal is displayed through optical modulation due to a reflection, scattering, interference phenomena, or so on is called a light receiving display device.

The light emitting display device is called an active display device and comprises, for example, a cathode ray tube (CRT), a plasma display panel (PDP), an organic electroluminescent display (OELD).

The light receiving display device is called a passive display device and comprises, for example, a liquid crystal display (LCD) and an electrophoretic image display (EPID).

Recently, due to a rapid progress of semiconductor technology, decreases in voltage and power of several electronic devices and decreases in size, decrease in thickness, and decreases in weight of electronic appliances are required. Accordingly, flat panel displays such as the liquid crystal display, the plasma display panel, and the organic electroluminescent display have been developed and a liquid crystal display that can accommodate the decrease in size, decrease in weight, and decrease in thickness and that has low power consumption and a low driving voltage has been in the spotlight among the flat panel displays.

The liquid crystal display is a display device for displaying a desired image by forming a liquid crystal layer having dielectric anisotropy between an upper substrate and a lower substrate, which are transparent insulating substrates, changing molecule arrangement of a liquid crystal material through adjusting an intensity of an electric field formed in the liquid crystal layer, and thus adjusting an amount of light transmitted in the upper substrate, which is a display plane.

Because the liquid crystal display is a light receiving display device which itself cannot emit light, the liquid crystal display requires a back light that is positioned at the rear of a liquid crystal panel for displaying an image and to uniformly sustain brightness of an entire screen.

As a light source of the back light, a cold cathode fluorescent lamp (CCFL), an external electrode fluorescent lamp (EEFL), or other sources have been used. However, recently, the light emitting diode that can semi-permanently use and have an excellent energy saving effect, compared to the CCFL and the EEFL, has been promoted as a future generation light source.

So far, the light emitting diode has generally been used as a light source of a back light for a small-sized liquid crystal display devices such as mobile phones. However, recently, as the brightness of the light emitting diode improves, the light emitting diode is used as a light source of a back light for medium and large-sized liquid crystal display devices and has been gradually widely used.

Hereinafter, a light emitting diode for a back light of an existing liquid crystal display and a driving circuit thereof will be described.

Figure 1:
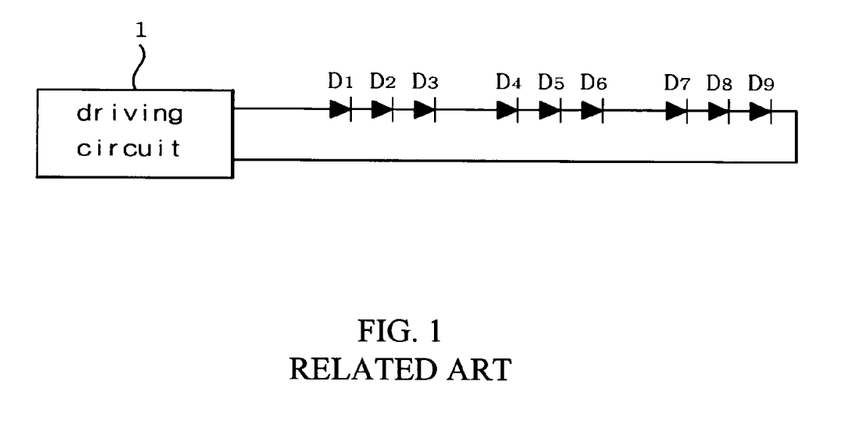
FIG. 1 is a diagram illustrating a driving circuit of a LED for a back light of a liquid crystal display in the related art.

FIG. 1 is a diagram illustrating a driving circuit of a light emitting diode for a back light of the liquid crystal display in the related art.

To drive a plurality of light emitting diodes D1 to D9 that are connected in series to each other, a driving circuit 1 of the light emitting diode in the related art boosts an input voltage to a predetermined level and outputs the voltage. For example, if an input voltage of 18V to 48V is transferred to the driving circuit 1 of the light emitting diode, the driving circuit 1 of the light emitting diode boosts the input voltage and outputs 200V to 380V as an output voltage according to the number of the light emitting diodes D1 to D9.

However, the driving circuit of the LED for the back light of the liquid crystal display in the related art requires many basic parts in constituting a unit circuit as shown in FIG. 1, whereby a circuit structure is complicated. Particularly, because many light emitting diodes are connected to the unit circuit, it is required to boost an input voltage to a high level of voltage.

Further, because the input voltage should be boosted to a high level of voltage, a separate over voltage protection (OVP) circuit is required to satisfy a safety specification, whereby there may be a problem that energy conversion efficiency is deteriorated.

SUMMARY

A driving apparatus of a light emitting diode includes a plurality of light emitting diode groups in which light emitting diodes are connected in series to each other; a plurality of constant voltage supply units that supplies a constant voltage required for driving a constant current to each of the plurality of light emitting diode groups and that outputs the constant voltage in which an output voltage is equal to or lower than an input voltage; and a pulse width modulation signal supply unit that supplies a pulse width modulation signal to each of the constant voltage supply units.

A liquid crystal display is disclosed, including a liquid crystal panel; and a driving apparatus of a light emitting diode for illuminating the liquid crystal panel at the rear of the liquid crystal panel, wherein the driving apparatus of the light emitting diode includes a plurality of light emitting diode groups in which LEDs are connected in series to each other; a plurality of constant voltage supply units that supplies a constant voltage required for driving a constant current to each of the plurality of light emitting diode groups and that adjusts so that the constant voltage is equal to or lower than an input voltage; and a pulse width modulation signal supply unit that supplies a pulse width modulation signal to each of the plurality of the constant voltage supply units.

Further features will be apparent from the following description, comprising the drawings, and the claims.

BRIEF DESCRIPTION OF THE DRAWINGS

The implementation of this document will be described in detail with reference to the following drawings in which like numerals refer to like elements.

DETAILED DESCRIPTION

Figure 2:
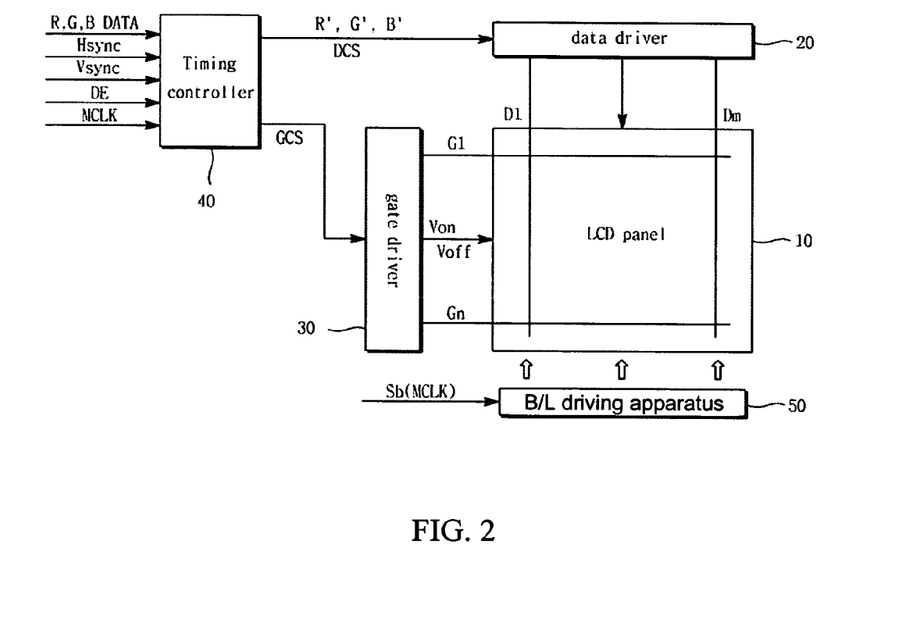
FIG. 2 is a block diagram schematically illustrating a driving circuit of a liquid crystal display.

FIG. 2 is a block diagram schematically illustrating a driving circuit of a liquid crystal display. As shown in FIG. 2, the LCD comprises a liquid crystal panel 10 that displays an image, a data driver 20 that drives data lines (D1, . . . , Dm) of the liquid crystal panel 10, a gate driver 30 that drives gate lines (G1, . . . , Gn) of the liquid crystal panel 10, a timing controller 40 that applies several control signals to the data driver 20 and the gate driver 30, and a driving apparatus of a LED 50 that supplies light to the liquid crystal panel 10.

The timing controller 40 receives a gray scale data signal R, G, and B DATA, a horizontal sync signal Hsync, a vertical sync signal Vsync, a data enable DE, and a main clock MCLK from the outside. The timing controller 40 supplies necessary control signals DCS and GCS to each of the data driver 20 and the gate driver 30.

Further, the timing controller 40 generates converted digital video signals R', G', and B' by adjusting digital video signals R, G, and B DATA that are input from the outside. The timing controller 40 then applies the converted digital video signals R', G', and B' to the data driver 20 side.

The data enable DE is a signal that designates a data output region and the main clock MCLK is a reference clock signal. The main clock MCLK is input from a microprocessor.

The data driver 20 generates an analog gray scale voltage corresponding to the converted digital video signals R', G', and B' that are input from the timing controller 40 in response to a data control signal DCS that is input from the timing controller 40.

Thereafter, when gate lines (G1, . . . , Gn) turned off by a gate off voltage Voff are turned on by a gate-on voltage Von applied to the gate lines (G, . . . , Gn) in response to the gate control signal GCS, an analog gray scale voltage generated in the data driver 20 is applied to data lines (D1, . . . , Dm) of the liquid crystal panel 10.

The driving apparatus of the LED 50 comprises a plurality of LED groups (not shown) that are positioned at the rear of the liquid crystal panel 10 to transmit light to the liquid crystal panel 10 and receive a light source control signal (Sb) generated from an external microprocessor to control lighting of the plurality of LED groups.

The light source control signal Sb that controls the driving apparatus of the LED 50 is generated through the main clock MCLK independently from the control signals DCS and GCS that are output from the timing controller 40.

Figure 3:
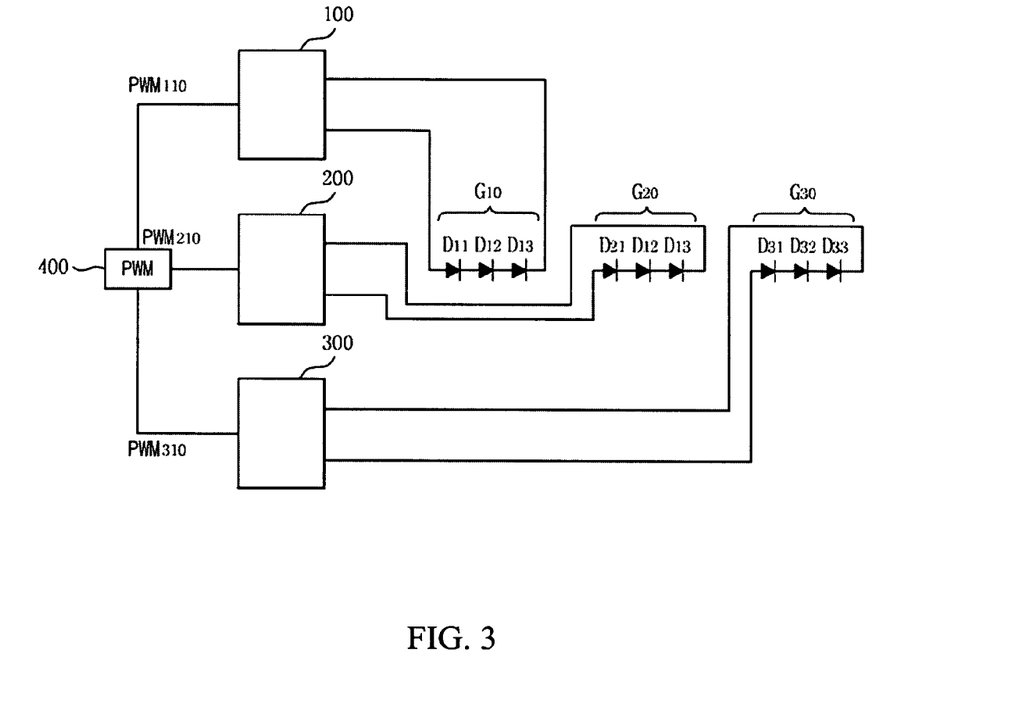
FIG. 3 is a diagram illustrating a detailed configuration of a driving apparatus of a light emitting diode.

A configuration of the driving apparatus of the LED 50 is as follows. FIG. 3 is a diagram illustrating a detailed configuration of the driving apparatus of the light emitting diode. As shown in FIG. 3, the driving apparatus of the LED comprises a plurality of LED groups G10, G20, and G30, a plurality of constant voltage supply units 100, 200, and 300, and a pulse width modulation signal supply unit 400.

In each of the LED groups G10, G20, and G30, a plurality (n) of LEDs D11 to D13 are connected in series to each other. The LED groups G10, G20, and G30 are divided into each backlight area and finally emit white light so as to transmit light to the liquid crystal panel 100.

As shown in FIG. 3, in the LEDs D11 to D13 connected to each of the LED groups G10, G20, and G30. Because a comparatively small number (n) of LEDs D11 to D13 are connected per one group, compared to an existing one, an output voltage that is equal to or less than an input voltage can be used as a driving voltage.

The plurality of constant voltage supply units 100, 200, and 300 supplies a constant voltage required for driving a constant current of each of the LED groups G10, G20, and G30. The first constant voltage supply unit 100 supplies a constant voltage to the first LED group G10, the second constant voltage supply unit 200 supplies a constant voltage to the second LED group G20, and the third constant voltage supply unit 300 supplies a constant voltage to the third LIED group G30.

The plurality of constant voltage supply units 100, 200, and 300 output a constant voltage to each of the LED groups G10, G20, and G30 equal to or lower than an input voltage that is input to the constant voltage supply units 100, 200, and 300. The pulse width modulation signal supply unit 400 supplies a pulse width modulation (PWM) signal to the plurality of constant voltage supply units 100, 200, and 300.

The pulse width modulation signal is a control signal for controlling a driving voltage of the LED groups G10, G20, and G30 and can control brightness of the LED groups G10, G20, and G30 by adjusting a width of a square wave.

Figure 4:
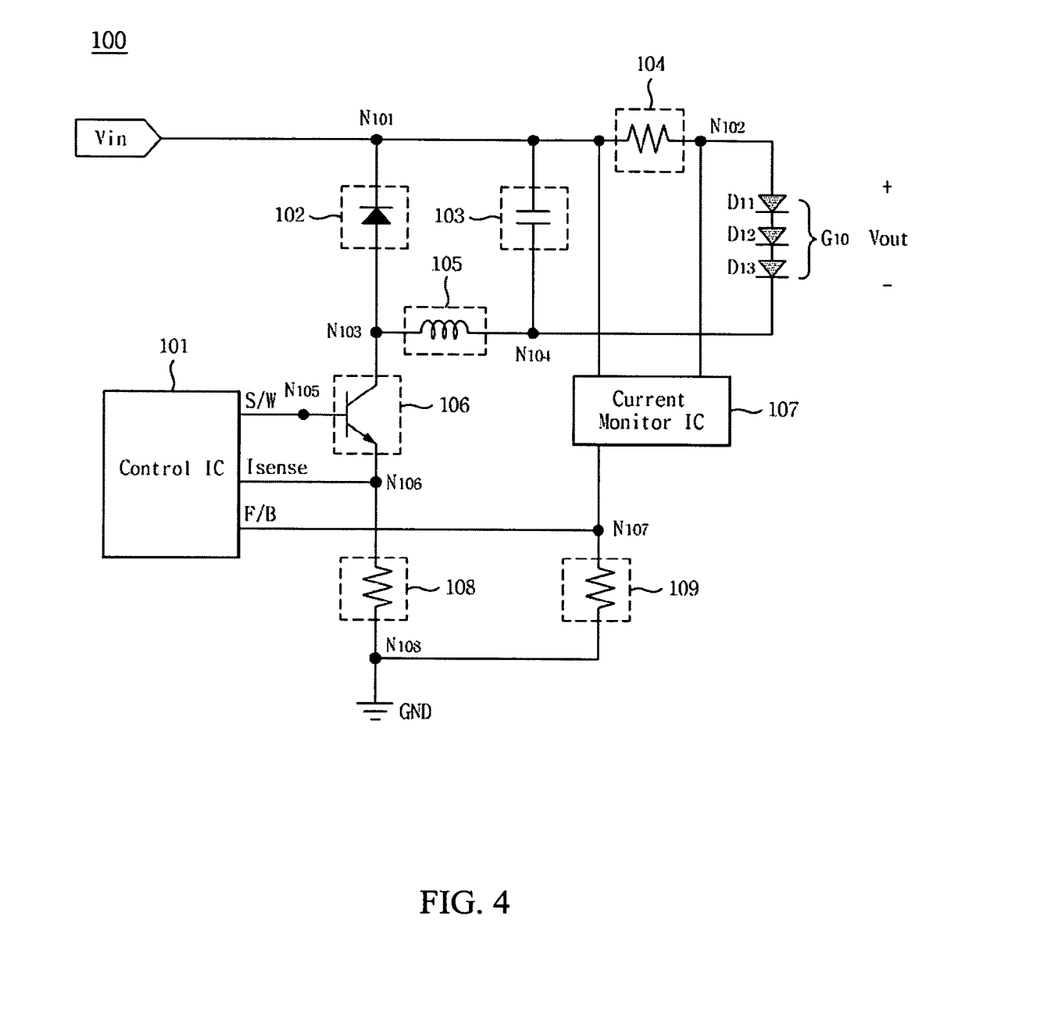
FIG. 4 is a circuit diagram illustrating a detailed configuration of a constant voltage supply unit in the driving apparatus of the light emitting diode shown in FIG. 3.
Figure 5:
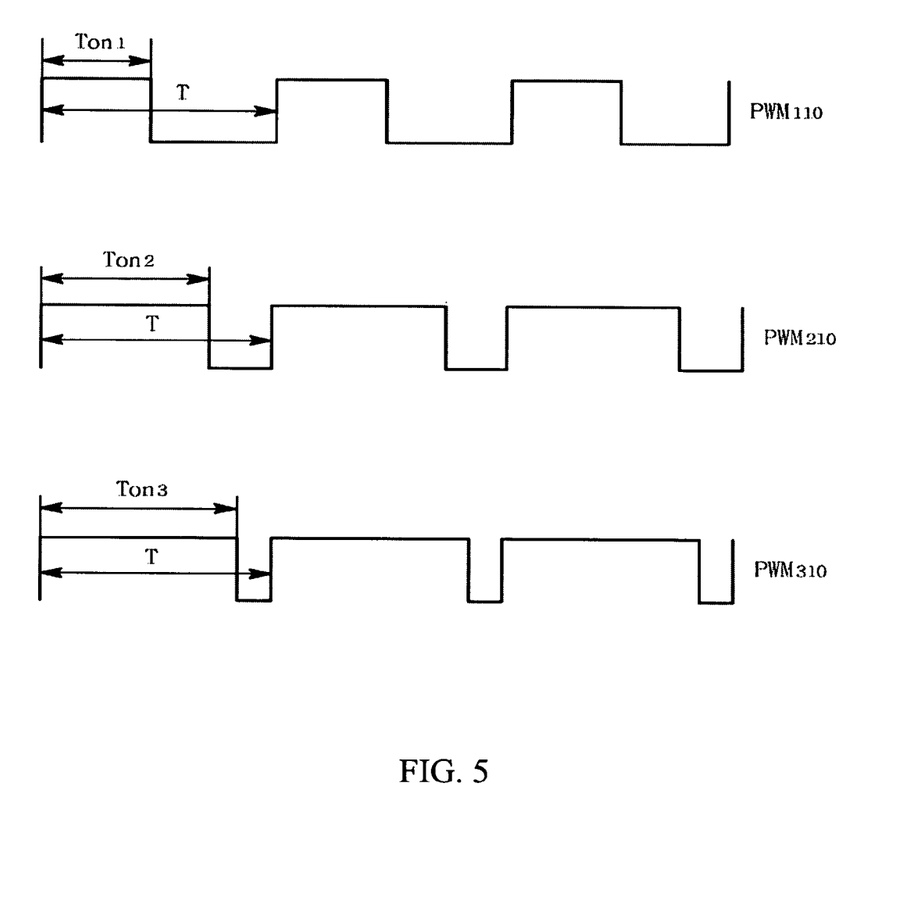
FIG. 5 is a graph illustrating pulse width modulation signals of the driving apparatus of the light emitting diode.

In FIGS. 4 and 5, a constant voltage supply unit of the driving apparatus of the LED and a pulse width modulation signal will be described in detail.

FIG. 4 is a circuit diagram illustrating a detailed configuration of a constant voltage supply unit in the driving apparatus of the liquid crystal display shown in FIG. 3.

As shown in FIG. 4, the constant voltage supply unit 100 comprises a switching control signal supply unit 101, a switching element 106, an energy storage unit 105, and a diode 102. The constant voltage supply unit 100 generally uses a buck type circuit. The switching control signal supply unit 101 supplies a pulse type switching control signal S/W to the switching element 106. The switching control signal S/W controls a turn-on time of the switching element 106.

The switching element 106 is turned on according to the switching control signal S/W applied from the switching control signal supply unit 101 and can control an energy storage amount for a turn-on time.

The switching element 106 may comprise a metal oxide semiconductor field effect transistor (MOS FET) or a bipolar junction transistor (BJT), as shown in FIG. 4.

The energy storage unit 105 stores energy supplied through the switching element 106. The energy storage unit 105 may comprise an inductor. Specifically, the inductor has a value of about 1 μH to 100 mH.

The diode 102 may transfer energy stored in the energy storage unit 105 to the LED group G10. Accordingly, in the constant voltage supply unit 100 having the above structure, if a switching control signal S/W supplied through the switching control signal supply unit 101 is "Hi," the switching element 106 is turned-on. A current flowing to the energy storage unit 105 increases and energy is stored in the energy storage unit 105.

Thereafter, if a switching control signal S/W supplied through the switching control signal supply unit 101 is "low", the switching element 106 is turned-off and at the same time. Energy stored in the energy storage unit 105 is transferred to the LED group G10, so that a current flowing to the energy storage unit 105 decreases.

The LEDs D11 to D13 of the LED group G10 may comprise a number of LEDs about 2<n<32. Particularly, the number (n) of LEDs D11 to D13 constituting the LED group G10 can be determined according to a magnitude of a maximum output voltage (Vout) in which the constant voltage supply unit 100 can supply.

For example, if an input voltage (Vin) transferred to the constant voltage supply unit 100 is 48V and a voltage required for driving each of the LEDs D11 to D13 is 3V, a maximum output voltage (Vout) in which the constant voltage supply unit 100 can supply is 48V, so that the maximum number (n) of the LEDs D11 to D13 of the LED group G10 is 16.

However, considering that the driving apparatus of the LED should be driven according to a safety specification, the number (n) of the LEDs D11 to D13 constituting the LED group G10 can be determined so that an output voltage (Vout) that is equal to or lower than an input voltage (Vin) applied to the constant voltage supply unit 100 is in a range required as a driving voltage.

The switching control signal supply unit 101 is connected to a sixth node N106 to transfer an energy amount adjustment current (Isense) to the switching element 106 through the sixth node N106. The energy amount adjustment current (Isense) limits an upper limit value of an energy amount stored in the energy storage unit 105 when the switching element 106 is turned-on. Accordingly, damage of an element due to an excessive current is prevented.

If an energy amount stored in the energy storage unit 105 when the switching element 106 is turned on is greater than that of an existing current, an energy amount may be adjusted by adjusting a turn-on time of the switching element 106.

A magnitude of an energy amount adjustment current (Isense) can be adjusted by adjusting a value of a resistor 108 connected to the sixth node N106 and the resistor 108 may be adjusted to have a value of 10 mΩ to 10Ω.

Further, the switching control signal supply unit 101 is connected to a seventh node N107 to receive a feedback voltage F/B from the seventh node N107.

The switching control signal supply unit 101 has a fixed reference voltage at the inside thereof. Therefore, the switching control signal supply unit 101 controls so that a fixed output voltage (Vout) is transferred to the LED group G10 by adjusting a turn-on time of the switching element 106 when a difference exists between a reference voltage and a feedback voltage F/B applied from the switching control signal supply unit 101 to the seventh node N107.

A magnitude of the feedback voltage F/B can be adjusted by adjusting a value of a resistor 109 connected to the seventh node N107. The resistor 109 can be adjusted to have a value of 10Ω to 100Ω.

As shown in FIG. 4, the diode 102 is connected between a first node N101 and a third node N103, the energy storage unit 105 is connected between the third node N103 and a fourth node N104. The switching element 106 is connected to the third node N103, a fifth node N105, and the sixth node N106.

The switching control signal supply unit 101 is connected to the fifth node N105, the sixth node N106, and the seventh node N107. A resistor 108 that adjusts a magnitude of an energy amount adjustment current (Isense) is connected between the sixth node N106 and an eighth node N108. A resistor 109 that adjusts a magnitude of a feedback voltage F/B is connected between the seventh node N107 and the eighth node N108. The LED group G10 is connected between the second node N102 and the fourth node N104 to receive an output voltage (Vout) supplied from the constant voltage supply unit 100.

A capacitor 103 is connected between the first node N101 and the fourth node N104 and performs a function of reducing a ripple voltage of an output voltage (Vout) supplied to the LED group G10. Specifically, capacitance of the capacitor 103 can be adjusted to have a value of about 1 μF to 100 μF.

A current sensing resistor 104 is connected between the first node N101 and the second node N102. The current sensing resistor 104 senses a current transferred to the LED group G10 by an output voltage (Vout) in which the constant voltage supply unit 100 supplies and the current sensing resistor 104 can be adjusted to have a value of about 10 mΩ to 100 mΩ.

Further, a current adjusting unit 107 is connected to the first node N101, the second node N102, and the seventh node N107. The current adjusting unit 107 is adjusted so that a current sensed through the current sensing resistor 104 has a fixed current value and transfers the value to the seventh node N107.

The current adjusting unit 107 reduces a current sensed through the current sensing resistor 104 in a ratio of ½ to ¹⁄₁₀₀ and transfers the current to the seventh node N107, so that a magnitude of a feedback voltage F/B transmitted to the switching control signal supply unit 101 can be reduced. Therefore, power consumption can be effectively reduced. The current adjusting unit 107 may comprise an operational amplifier.

An input voltage (Vin) is applied to the first node N101. A ground voltage GND is applied to the eighth node N108. A pulse width modulation signal PWM110 is applied to the switching control signal supply unit 101.

Accordingly, the constant voltage supply unit 100 supplies an output voltage (Vout) that is lower than or equal to the input voltage (Vin) by lowering the input voltage (Vin) to a predetermined voltage.

The pulse width modulation signal PWM110 applied to the switching control signal supply unit 101 can adjust a turn-on time of the switching element 106 in proportion to a duty ratio Ton1/T, as shown in FIG. 5.

Although the first constant voltage supply unit 100 is exemplified in the above description, each of the second constant voltage supply unit 200 and the third constant voltage supply unit 300 may be equal to the first constant voltage supply unit 100. By supplying the pulse width modulation signals PWM110, PWM210, and PWM310 to the first to the third constant voltage supply units 100, 200, and 300, respectively, each activation time of the LED groups G10, G20, and G30 can be adjusted.

FIG. 5 is a graph illustrating pulse width modulation signals of the driving apparatus of the liquid crystal display. As shown in FIG. 5, when a duty ratio Ton1/T of the first pulse width modulation signal PWM110 is shortest and a duty ratio Ton3/T of the third pulse width modulation signal PWM310 is longest, an activation time of the first LED group G10 driven according to the first pulse width modulation signal PWM110 is shortest. An activation time of the third LED group G30 driven according to the third pulse width modulation signal PWM310 is longest.

The duty ratio Ton1/T of the pulse width modulation signal PWM110 can independently adjust each brightness of the LED groups G10, G20, and G30. Accordingly, when the LED groups are used as a back light for the LCD, brightness can be partially adjusted.

When a LED is used as a back light of a flat panel display such as a LCD, a circuit for boosting the input voltage is unnecessary by dividing and driving a driving voltage for driving a plurality of LEDs into each group using a low voltage that is equal to or lower than an input voltage, so that a circuit structure of the driving apparatus of the LED can be simplified.

Further, a circuit structure of the driving apparatus of the LED may comprise a low pressure and low current element, so that the cost can be reduced.

Particularly, when a buck type circuit is applied, the number (e.g., the number of LEDs connected to a unit circuit) of the parts constituting a unit circuit is fewer than that of an existing type (boost type). When an output thereof is in a no-load status, a danger of overload can be solved, so that a circuit can be safely operated.

Further, because an additional protection circuit for preventing an overload is unnecessary, conversion efficiency is high.

Further, even if an LED is used as a back light, an input power source of a fluorescent lamp can be used just as it is, so that it is unnecessary to adjust a production line.

The invention being thus described, it will be obvious that the same may be varied in many ways. Such variations are not to be regarded as a departure from the spirit and scope of the invention, and all such modifications as would be obvious to one skilled in the art are intended to be comprised within the scope of the following claims.

What is claimed is:

1. A driving apparatus of a light emitting diode (LED) comprising:
   a plurality of light emitting diode groups in which n (wherein n is greater than 2 and less than 32) light emitting diodes are connected to each other;
   a plurality of constant voltage supply units that supply a constant voltage to drive a constant current to the plurality of light emitting diode groups and that output the constant voltage in which an output voltage is equal to or lower than an input voltage, wherein each of the constant voltage supply units is connected to any one of the light emitting diode groups; and
   a pulse width modulation signal supply unit that supplies a pulse width modulation signal to respective ones of the plurality of constant voltage supply units,
   wherein the each constant voltage supply unit comprises,
   a switching control signal supply unit that supplies a switching control signal;
   a switching element that is turned on depending on a switching control signal supplied from the switching control signal supply unit and that adjusts a storing amount of energy depending on a turn-on time, wherein the switching element has a base terminal connected to a fifth node, a collector terminal connected to a third node, and a emitter terminal connected to a sixth node;
   an inductor that stores energy supplied through the switching element, wherein the inductor is connected between the third node and a fourth node;
   a diode that transfers energy stored in the inductor to each of the plurality of light emitting diode groups, wherein the diode has a cathode connected to a first node and an anode connected to the third node;
   a current sensing resistor connected between the first node and a second node to sense a current transferred to the each light emitting diode group;
   a current adjusting unit connected to the first node, the second node, and a seventh node to adjust a current sensed through the current sensing resistor;
   a capacitor connected between the first node and the fourth node to reduce a ripple voltage of an output voltage supplied to the light emitting diode groups;
   a first resistor connected between the sixth node and a ground voltage source to adjust a magnitude of an energy amount adjustment current from the switching control signal supply unit; and
   a second resistor connected between the seventh node and the ground voltage source to adjust a magnitude of a feedback voltage from the current adjusting unit,
   wherein the switching control signal supply unit supplies the switching control signal to the base terminal of the switching element through the fifth node, transfers the energy amount adjustment current to the emitter terminal of the switching element through the sixth node, and receives a feedback voltage from current adjusting unit through the seventh node.

2. The driving apparatus of claim 1, wherein the light emitting diodes are connected in series to each other.

3. The driving apparatus of claim 1, wherein the switching element comprises a metal oxide semiconductor field effect transistor.

4. The driving apparatus of claim 1, wherein the switching element comprises a bipolar junction transistor.

5. A liquid crystal display comprising:
   a liquid crystal panel; and
   a driving apparatus of a light emitting diode that illuminates the liquid crystal panel at a rear of the liquid crystal panel,
   wherein the driving apparatus of the light emitting diode comprises:
   a plurality of light emitting diode groups in which n (wherein n is greater than 2 and less than 32) light emitting diodes are connected to each other;
   a plurality of constant voltage supply units that supply a constant voltage to drive a constant current to each of the plurality of light emitting diode groups and that output the constant voltage in which an output voltage is equal to or lower than an input voltage, wherein each of the constant voltage supply units is connected to any one of the light emitting diode groups; and
   a pulse width modulation signal supply unit that supplies a pulse width modulation signal to respective ones of the plurality of the constant voltage supply units,
   wherein the each constant voltage supply unit comprises,
   a switching control signal supply unit that supplies a switching control signal;
   a switching element that is turned on depending on a switching control signal supplied from the switching control signal supply unit and that adjusts a storing amount of energy depending on a turn-on time, wherein the switching element has a base terminal connected to a fifth node, a collector terminal connected to a third node, and a emitter terminal connected to a sixth node;
   an inductor that stores energy supplied through the switching element, wherein the inductor is connected between the third node and a fourth node;
   a diode that transfers energy stored in the inductor to each of the plurality of light emitting diode groups, wherein the diode has a cathode connected to a first node and an anode connected to the third node;
   a current sensing resistor connected between the first node and a second node to sense a current transferred to the each light emitting diode group;
   a current adjusting unit connected to the first node, the second node, and a seventh node to adjust a current sensed through the current sensing resistor;

a capacitor connected between the first node and the fourth node to reduce a ripple voltage of an output voltage supplied to the light emitting diode groups;

a first resistor connected between the sixth node and a ground voltage source to adjust a magnitude of an energy amount adjustment current from the switching control signal supply unit; and a second resistor connected between the seventh node and the ground voltage source to adjust a magnitude of a feedback voltage from the current adjusting unit, wherein the switching control signal supply unit supplies the switching control signal to the base terminal of the switching element through the fifth node, transfers the energy amount adjustment current to the emitter terminal of the switching element through the sixth node, and receives a feedback voltage from current adjusting unit through the seventh node.

6. The liquid crystal display of claim 5, wherein the light emitting diodes are connected in series to each other.

* * * * *